April 13, 1965   H. KARKER ETAL   3,178,335
HONEYCOMB STRUCTURE
Filed Aug. 18, 1960   2 Sheets-Sheet 2
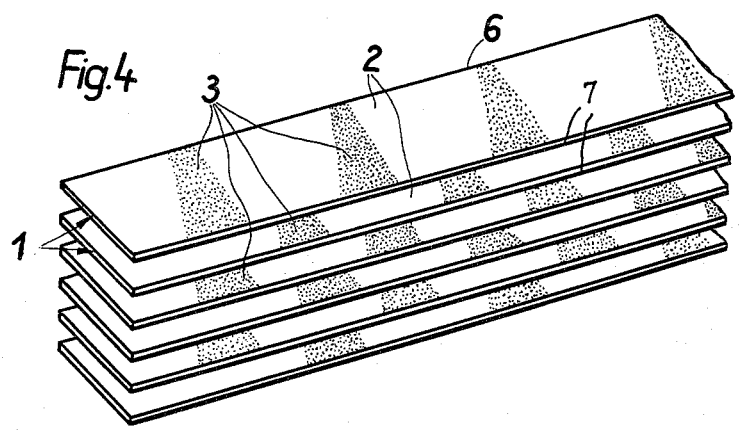
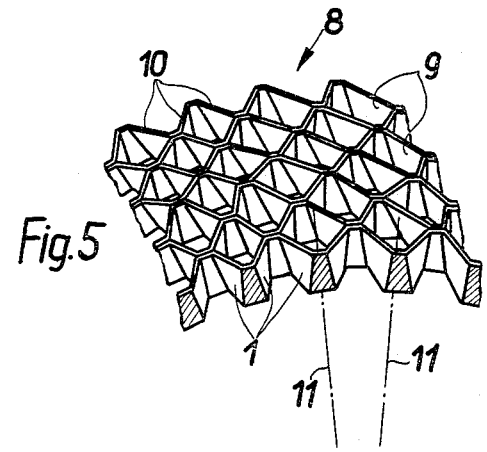
INVENTORS:
Herbert Karker
Siegfried Bönisch
BY
their ATTORNEY

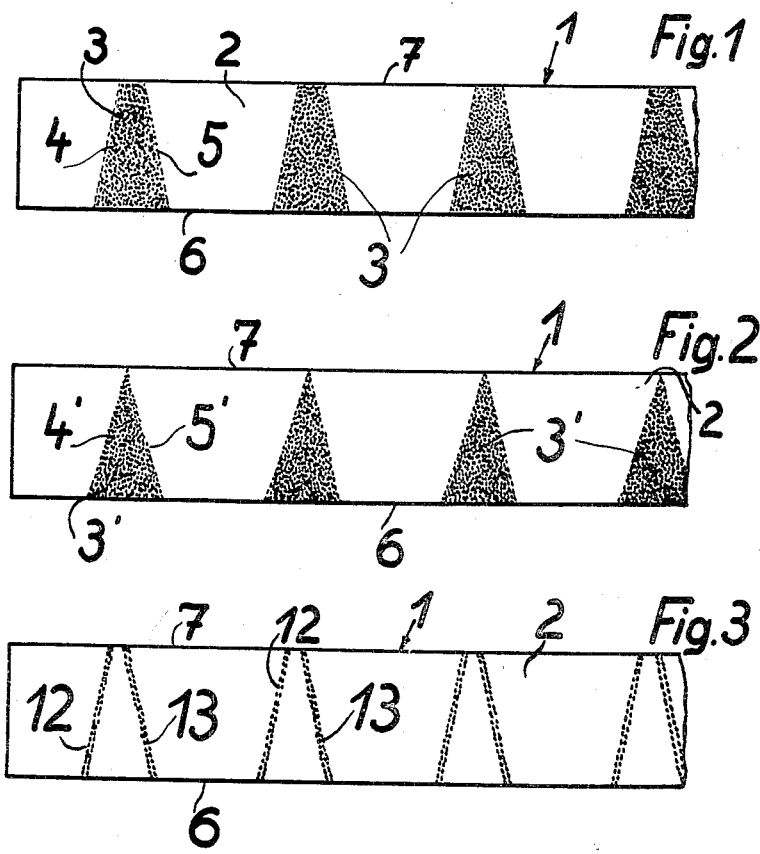

United States Patent Office 3,178,335
Patented Apr. 13, 1965

3,178,335
HONEYCOMB STRUCTURE
Herbert Karker and Siegfried Bönisch, Dresden, Germany, assignors to Forschungszentrum der Luftfahrtindustrie, Dresden, Germany
Filed Aug. 18, 1960, Ser. No. 50,345
2 Claims. (Cl. 161—68)

The present invention relates to honeycomb structures in general, and more particularly to a honeycomb structure which, among other applications, is useful as a load-carrying means known as stressed skin to constitute the covering of certain airplane components and the like.

It is already known to assemble a honeycomb structure by connecting a series of strips at spaced intervals to form a package and by thereupon stretching the package in a direction transverse to the longitudinal direction of the strips. The zones of connection between the adjacent strips are bounded by parallel lines and extend from one longitudinal edge toward but short of the other longitudinal edge of the respective strips. Such formation of connecting zones brings about a certain flexibility of the honeycomb structure, i.e., the finished product is bendable to a limited extent into an arcuate plane without immediately destroying the connections between the individual sheets. However, the bendability of honeycomb structures of the just described type is too limited and, consequently, they cannot be utilized as covers or skins for strongly arched components of an aircraft or the like. The resistance to deformation increases with the stiffness of individual strips, with the width of the strips, and also with increasing transverse dimensions of the connecting zones. To prevent rapid destruction of a so constructed honeycomb structure, the strips are often formed with cutouts or slits which extend transversely to the longitudinal direction of the strips. However, it has been found that the provision of slits greatly reduces the shearing strength of the honeycomb structure.

An important object of the present invention is to provide a honeycomb structure which is constructed and assembled in such a way that it will inherently assume an arcuate shape when the individual strips are connected to each other and thereupon subjected to a force in a direction transverse to their longitudinal direction.

Another object of the invention is to provide a honeycomb structure of the just outlined characteristics which may be constructed and assembled in such a way that it can assume any desired curvature.

A concomitant object of the instant invention is to provide a honeycomb structure which can be assembled in a very simple and time-saving manner.

An additional object of the invention is to provide a honeycomb structure which is constructed and assembled in such a way that the walls surrounding the individual cells defined by the connected strips are subjected to little or no stresses when the honeycomb structure assumes the form of an arcuate body.

With the above objects in view, the invention resides in the provision of a honeycomb structure which comprises essentially a pair of outer strips and at least one intermediate strip, the intermediate strip being connected with the two outer strips at a plurality of spots or zones whose outlines converge in a direction from the one to the other longitudinal edge of the strips. When the package of assembled strips is thereupon stretched transversely to the longitudinal direction of its strips to form a honeycomb structure provided with a series of cells between each pair of adjacent strips, the honeycomb structure necessarily assumes an arcuate shape which is convex when looked at from one side and concave when looked at from the other side. By suitable selection of the mutual inclination of outlines of the connecting zones, the curvature of the assembled honeycomb structure may be determined in advance, depending upon the intended use of the structure.

If desired, the zones of connection between the adjacent strips may assume a triangular or a trapezoidal form. It is equally possible to provide only spaced pairs of mutually inclined comparatively narrow lines of binding bounding the zones of connection between two adjacent strips. The zones of connection may extend all the way between the longitudinal edges of adjacent strips without in any way impairing the ability of the honeycomb structure to assume an arcuate shape, such shape depending solely on the mutual inclination of the outlines of connecting zones.

In the fully assembled honeycomb structure, the imaginary axes of cells formed between the adjacent strips are inclined with respect to each other, i.e., they intersect in the imaginary centers of curvature of the honeycomb structure.

It is preferred to stagger the zones of connection between one side of a first strip and a second strip with respect to the zones of connection between the other side of the first strip and a third strip so that the zones of connection at one side of an intermediate strip alternate with zones of connection at the other side of the same intermediate strip.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawing, in which:

FIG. 1 is a plan view of a strip one side of which is provided with spaced substantially trapezoidal zones of binding extending between the longitudinal edges of the strip;

FIG. 2 is a similar view of a strip which is provided with spaced triangular zones of binding;

FIG. 3 is a similar view of a strip which is provided with spaced pairs of mutually inclined binding lines;

FIG. 4 is an exploded perspective view of a series of strips each coated with binding material in the manner shown in FIG. 1, the strips assuming the illustrated position before being joined into a package; and FIG. 5 is a perspective view of a completed honeycomb structure.

Referring now in greater detail to the illustrated embodiments, and first to FIG. 1, there is shown a strip 1 made of a suitable flexible material, e.g., textile, paper or whose exposed side 2 carries spaced substantially trapezoidal binding zones or spots 3 of a suitable means for binding. Each zone 3 is bounded by two substantially straight outlines 4, 5 which converge in a direction from the lower longitudinal edge 6 toward the upper longitudinal edge 7 of the strip 1. As is shown in FIG. 4, a series of strips 1 is then stacked into a package with the binding zones 3 of adjacent strips 1 staggered relative to each other. By compressing the package in a direction perpendicular to the planes of the strips 1, the latter form a body whose thickness equals the combined thickness of all strips. After the binding zones have properly adhered to the adjacent sides of the strips, the package is stretched in a direction substantially perpendicular to the planes of the strips 1 to form a honeycomb structure 8 shown in FIG. 5. It will be noted that the package of FIG. 4 comprises two outer strips 1 and four intermediate strips 1, but the overall number of strips is usually much higher and depends on the desired dimensions of the honeycomb structure 8. The walls 10 surrounding the cells 9 in the structure 8 consist of strip portions extending between the adjacent binding zones 3. It will be readily seen that the honeycomb structure inherently assumes the form of an arcuate body because the zones of binding are bounded by converging outlines. This arcuate body may be further deformed, of necessary, without risking that the zones of connection would be subjected to excessive stresses. By suitable inclination of the outlines of binding zones 3, the curvature of the honeycomb structure may be determined in advance. It will be noted that the imaginary axes 11 of cells 9 are inclined with respect to each other; these axes intersect in a point or in points lying on an axis or in imaginary centers of curvature respectively of the honeycomb structure 8.

Referring now to FIG. 2, the strip 1 is provided with spaced zones 3' of binding material which are of triangular shape, their outlines 4', 5' converging from the edge 6 toward the edge 7. The configuration of a honeycomb structure assembled from strips coated as in FIG. 2 differs only slightly from the configuration of the structure 8.

FIG. 3 illustrates a further modification according to which the binding material is applied in the form of two mutually inclined lines 12, 13 which converge from the edge 6 toward the edge 7. These lines may but need not merge at a point adjacent to the edge 7, i.e., the point of connection may assume a trapezoidal or a triangular form. The distance between the pairs of mutually inclined binding lines 12, 13 determines the length of walls 10 which bound the cells of the fully assembled honeycomb structure.

FIGS. 1 to 3 show strips with binding zones 3, 3' or 12, 13 applied only to one of their sides. However, it is equally possible to provide staggered zones of binding at the other side of a strip 1 and to place it between two non-coated strips. For example, and referring to FIG. 4, the uppermost, the third and the fifth strips need not be coated at all if the second and fourth strips are coated at both sides and if the lowermost strip is coated at its upper side.

The binding mentioned above of the strips may comprise in using a suitable adhesive material, e.g., glue, resin, etc., in soldering, in brazing, in welding or in a mechanical union, e.g., by means of rivets respectively.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A honeycomb structure having a concave side and a convex side, said honeycomb structure being composed of a plurality of hexagonal shaped cellular members; two opposite adhered walls of the hexagonal shaped members being of tapered configuration with the narrow portion thereof at the convex side and the four other walls of each of said hexagonal shaped members being of tapered configuration with the narrow portion thereof at the concave side, said four other walls forming two pairs of walls each of which pairs of walls is contained between said two opposite adhered walls.

2. A structure as set forth in claim 1, wherein said two opposite adhered walls of each hexagonal shaped member are of the same tapered configuration as said two opposite adhered walls of any adjacent hexagonal shaped member and coextensive therewith and binding material is confined to said coextensive opposite adhered walls securing the same to each other.

References Cited by the Examiner

UNITED STATES PATENTS

| | | | |
|---|---|---|---|
| 2,429,508 | 10/47 | Belaieff | 154—45 |
| 2,608,502 | 8/52 | Merriman | 154—110 |
| 2,668,327 | 2/54 | Steele | 18—47.5 |
| 2,973,294 | 2/61 | McClelland | 154—45.9 |

ALEXANDER WYMAN, *Primary Examiner.*

CARL F. KRAFFT, *Examiner.*